Dec. 4, 1962
F. PORTER
3,066,356
EXTRUSION OF POLYETHYLENE USING WATER AS LUBRICANT
Filed April 21, 1958
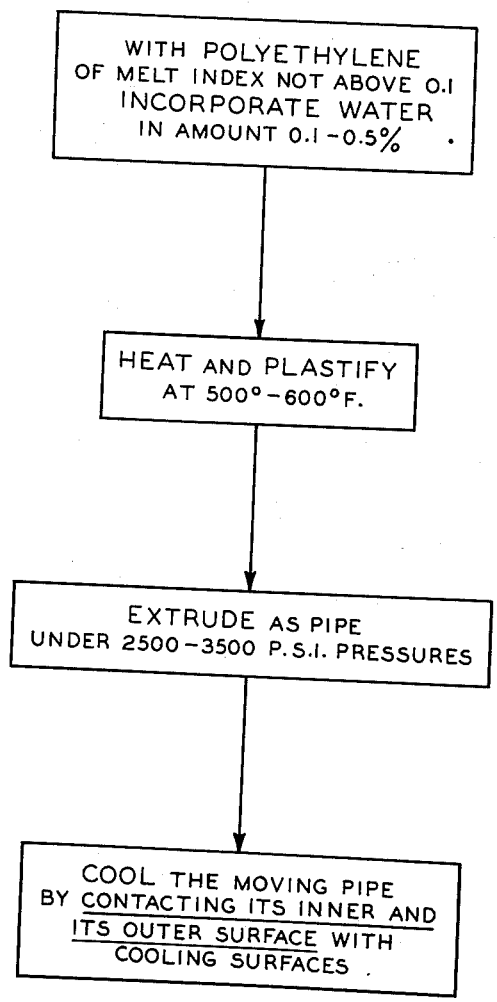
INVENTOR
FRANK PORTER
BY
Robert A. Harman
ATTORNEY

United States Patent Office 3,066,356
Patented Dec. 4, 1962

3,066,356
EXTRUSION OF POLYETHYLENE USING WATER AS LUBRICANT
Frank Porter, Morristown, N.J., assignor to Allied Chemical Corporation, a corporation of New York
Filed Apr. 21, 1958, Ser. No. 729,534
3 Claims. (Cl. 18—55)

This invention relates to production of extruded contours, especially pipe, from thermoplastic polyethylene.

A problem encountered in the art of extruding pipe from polyethylene plastic is that as it is cooled, the newly formed pipe tends to stick to forming and cooling surfaces such as cooled mandrels, cooled forming tubes and the like. It has been proposed to supply a lubricant liquid, e.g. by spraying or forcing it between the pipe and the cooled surface but such proposals present difficulties in practice.

I have now found that when specifically polyethylene is extruded, and contacted while in motion with cooling surfaces, the polyethylene can be lubricated by incorporating in the hot plastic very small amounts of a volatile, non-solvent liquid. Specifically the amounts used are in the range 0.01–0.5% by weight of the plastic. The liquid should have a boiling point from about 65° C. to about 150° C. at atmospheric pressure.

It is known that polyethylene at and slightly above normal room temperatures is virtually insoluble in almost all solvents, and that at higher temperatures, especially temperatures above the polyethylene melting point, the polyethylene becomes soluble in certain solvents such as hydrocarbons. I have found that very small amounts of liquids, which are non-solvents of polyethylene even at their boiling points, can be homogeneously dispersed in polyethylene at temperatures where it is plastic, i.e. temperatures above the polyethylene melting point. Moreover, I have found that when a polyethylene composition thus containing homogeneously dispersed non-solvent liquid is chilled below its melting point by contact with a cooled surface, the non-solvent liquid exudes and forms a film between the cooled surface and the polyethylene, which film provides lubrication between the plastic surface and the cooled surface. My invention is a practical application of these findings.

The process of my invention is illustrated in the annexed flow diagram.

My invention is illustrated by the following example wherein there is described completely a specific embodiment of my process, representing the best mode contemplated by me of carrying out my invention. The example however is illustrative only and it is not intended that the invention be limited to all details of the example.

EXAMPLE

A blend was formed by working for about one to two hours the following ingredients in a screw extruder:

| | Parts by weight |
|---|---|
| (1) A high molecular weight polyethylene of molecular weight over one million, as measured by the Ivan Harris method | 76 |
| (2) A low molecular weight wax type polyethylene of the type described in detail in Erchak U.S.P. 2,712,534 Example 3 | 21.5 |
| (3) Pigment carbon black | 2.5 |
| (4) Antioxidant | 0.25 |

The resulting composition had melt index, measured by the American Society for Testing Materials procedure ASTM-D-1238-52T below 0.1 but was extrudable at a rate of about 9 inches per minute of 2 inch pipe with wall thickness of $\frac{1}{16}$ inch. The extruder operated at temperatures in the range 500°–600° F. and at pressures in the range 2500–3500 pounds per square inch, with an elongated cooled forming tube and cooled mandrel attached to the extrusion die. There was a tendency of this composition to stick to the cooling tube and/or the cooled mandrel.

Water in amounts of 0.1–0.2 weight percent based on the weight of the above plastic blend was added to the blend via the extruder hopper prior to extrusion thereof. The resulting composition extruded smoothly without sticking under the same conditions as above employed, at rates of 12 to 20 inches per minute.

Use of excessive amounts of water, above about 0.5% by weight of the plastic composition, results in imperfections in the surface of the extruded pipe, apparently due to presence of droplets of water mixed inhomogeneously with the hot plastic.

My process is especially applicable to extrusion of polyethylene pipe using polyethylene of low melt index as described in the above example. Nevertheless my process can be used for extrusion of other grades of polyethylene and for production of contours other than pipe, for production of extruded coatings on wire, etc. Water is the preferred non-solvent liquid for use in my process but other liquids have like action, which action is primarily physical rather than chemical. A boiling range of about 65°–150° C. at atmospheric pressures is necessary for suitable liquids, and it is also necessary that the liquid be a non-solvent of polyethylene at temperatures up to and including the atmospheric boiling point of the liquid.

I claim:

1. Process wherein hot plastic polyethylene, which polyethylene has low melt index, not above about 0.1, is extruded and is thereafter contacted while in motion with cooling surfaces, which process comprises incorporating water in amounts in the range between about 0.01% and about 0.5% by weight of the polyethylene in the hot plastic polyethylene prior to extrusion thereof.

2. Process as defined in claim 1 wherein the hot plastic polyethylene composition is extruded in the form of pipe and thereafter moves with both the inner and outer pipe surfaces contacting cooling surfaces.

3. Process wherein hot plastic polyethylene is extruded and is thereafter contacted while in motion with cooling surfaces, which process comprises incorporating water in amounts in the range between about 0.01% and about 0.5% by weight of the polyethylene in the hot plastic polyethylene prior to extrusion thereof.

References Cited in the file of this patent

UNITED STATES PATENTS

| | | |
|---|---|---|
| 2,338,787 | Ushakoff | Jan. 11, 1944 |
| 2,482,949 | Tankovich | Sept. 27, 1949 |
| 2,528,200 | Weinberg | Oct. 31, 1950 |
| 2,698,463 | Conwell | Jan. 4, 1955 |
| 2,708,772 | Moncrieff | May 24, 1955 |
| 2,720,680 | Gerow | Oct. 18, 1955 |
| 2,814,071 | Allan et al. | Nov. 26, 1957 |
| 2,889,581 | Vanderhoof | Jan. 9, 1959 |
| 2,904,844 | Smithies | Sept. 22, 1959 |
| 2,909,810 | Jensch | Oct. 27, 1959 |